(12) United States Patent
Hendrickson

(10) Patent No.: US 8,803,341 B2
(45) Date of Patent: Aug. 12, 2014

(54) ENERGY HARVESTING ROADWAY PANEL

(75) Inventor: Brian S. Hendrickson, Boston, MA (US)

(73) Assignee: Kinetic Energy Corporation, Columbia, MD (US)

( * ) Notice: Subject to any disclaimer, the term of this patent is extended or adjusted under 35 U.S.C. 154(b) by 385 days.

(21) Appl. No.: 12/685,645

(22) Filed: Jan. 11, 2010

(65) Prior Publication Data

US 2010/0283255 A1 Nov. 11, 2010

Related U.S. Application Data

(60) Provisional application No. 61/143,754, filed on Jan. 9, 2009.

(51) Int. Cl.
*F02B 63/04* (2006.01)

(52) U.S. Cl.
USPC .......................................... 290/1 R

(58) Field of Classification Search
USPC .................................. 290/1 A, 1 R; 104/154
IPC .................. F03G 7/08; H02K 7/1853,7/71876, H02K 35/00; H02N 2/183, 2/186
See application file for complete search history.

(56) References Cited

U.S. PATENT DOCUMENTS

| | | |
|---|---|---|
| 1,312,131 A | 8/1919 | Morton |
| 1,771,200 A | 7/1930 | Akers |
| 1,916,873 A | 7/1933 | Wiggins |
| 3,748,443 A | 7/1973 | Kroll et al. |
| 3,859,589 A | 1/1975 | Rush |
| 3,885,163 A | 5/1975 | Toberman |
| 3,918,844 A | 11/1975 | Bailey |
| 3,944,855 A | 3/1976 | Le Van |
| 4,004,422 A | 1/1977 | Le Van |
| 4,081,224 A | 3/1978 | Krupp |
| 4,115,034 A | 9/1978 | Smith |
| 4,130,064 A * | 12/1978 | Bridwell ........................ 104/154 |
| 4,211,078 A | 7/1980 | Bass |
| 4,212,598 A | 7/1980 | Roche et al. |
| 4,228,360 A | 10/1980 | Navarro |
| 4,238,687 A | 12/1980 | Martinez |
| 4,239,974 A * | 12/1980 | Swander et al. .............. 290/1 R |
| 4,239,975 A | 12/1980 | Chiappetti |
| 4,247,785 A | 1/1981 | Apgar |
| 4,250,395 A | 2/1981 | Lundgren |

(Continued)

FOREIGN PATENT DOCUMENTS

| | | |
|---|---|---|
| CH | 1986/007504 A1 | 12/1986 |
| CN | 201045331 Y | 4/2008 |

(Continued)

OTHER PUBLICATIONS

Lee W. Young, International Search Report, PCT/US2009/066024, Apr. 2, 2010, p. 2, Alexandria, VA, US.

(Continued)

*Primary Examiner* — Vanessa Girardi
(74) *Attorney, Agent, or Firm* — Dresch IP Law, PLLC; John J. Dresch

(57) ABSTRACT

A vehicle energy harvesting roadway is provided. The vehicle energy harvesting roadway includes a deformable driving surface that is longitudinally flexible and transversely stiff. The deformable driving surface is disposed between a passing vehicle and one or more transducers or one or more compressible hoses.

22 Claims, 3 Drawing Sheets

(56) References Cited

U.S. PATENT DOCUMENTS

| | | | | |
|---|---|---|---|---|
| 4,309,150 A | * | 1/1982 | Payne | 417/229 |
| 4,322,673 A | | 3/1982 | Dukess | |
| 4,339,920 A | | 7/1982 | Le Van | |
| 4,409,489 A | * | 10/1983 | Hayes | 290/1 R |
| 4,418,542 A | | 12/1983 | Ferrell | |
| 4,434,374 A | | 2/1984 | Lundgren | |
| 4,437,015 A | | 3/1984 | Rosenblum | |
| 4,614,875 A | | 9/1986 | McGee | |
| 4,700,540 A | | 10/1987 | Byrum | |
| 4,739,179 A | | 4/1988 | Stites | |
| 4,912,995 A | | 4/1990 | Otters | |
| 4,915,196 A | | 4/1990 | Krisko | |
| 4,944,474 A | | 7/1990 | Jones | |
| 4,980,572 A | | 12/1990 | Sen | |
| 5,119,136 A | | 6/1992 | Morikawa | |
| 5,157,922 A | | 10/1992 | Baruch | |
| 5,250,769 A | | 10/1993 | Moore | |
| 5,347,186 A | | 9/1994 | Konotchick | |
| 5,355,674 A | | 10/1994 | Rosenberg | |
| 5,449,909 A | | 9/1995 | Kaiser et al. | |
| 5,634,774 A | | 6/1997 | Angel et al. | |
| 5,648,645 A | | 7/1997 | Arpagaus et al. | |
| 5,678,933 A | | 10/1997 | Ouchi et al. | |
| 5,977,742 A | | 11/1999 | Henmi | |
| 5,984,432 A | | 11/1999 | Otomo et al. | |
| 6,023,134 A | | 2/2000 | Carl et al. | |
| 6,091,159 A | * | 7/2000 | Galich | 290/1 R |
| 6,116,704 A | | 9/2000 | Nakakita et al. | |
| 6,172,426 B1 | * | 1/2001 | Galich | 290/1 R |
| 6,204,568 B1 | | 3/2001 | Runner | |
| 6,353,270 B1 | | 3/2002 | Sen | |
| 6,362,534 B1 | | 3/2002 | Kaufman | |
| 6,376,925 B1 | | 4/2002 | Galich | |
| 6,467,266 B1 | | 10/2002 | Kanazawa et al. | |
| 6,494,144 B1 | | 12/2002 | Perez Sanchez | |
| 6,580,177 B1 | * | 6/2003 | Hagood et al. | 290/1 R |
| 6,662,099 B2 | | 12/2003 | Knaian et al. | |
| 6,718,760 B1 | | 4/2004 | Padera | |
| 6,734,575 B2 | | 5/2004 | Ricketts | |
| 6,756,694 B2 | | 6/2004 | Ricketts | |
| 6,767,161 B1 | | 7/2004 | Calvo et al. | |
| 6,812,588 B1 | | 11/2004 | Zadig | |
| 6,858,952 B2 | | 2/2005 | Gott et al. | |
| 6,894,233 B2 | | 5/2005 | Dingwall et al. | |
| 6,936,932 B2 | | 8/2005 | Kenney | |
| 6,969,213 B2 | | 11/2005 | Rastegar et al. | |
| 7,043,904 B2 | | 5/2006 | Newman | |
| 7,067,932 B1 | | 6/2006 | Ghassemi | |
| 7,102,244 B2 | | 9/2006 | Hunter, Jr. | |
| 7,145,257 B2 | | 12/2006 | Ricketts | |
| 7,148,581 B2 | * | 12/2006 | Hershey et al. | 290/1 R |
| 7,239,031 B2 | | 7/2007 | Ricketts | |
| 7,315,088 B2 | | 1/2008 | Erriu | |
| 7,347,643 B2 | | 3/2008 | Jeong | |
| 7,371,030 B2 | | 5/2008 | Hickman | |
| 7,429,145 B2 | | 9/2008 | Rastegar et al. | |
| 7,541,684 B1 | | 6/2009 | Valentino | |
| 7,589,428 B2 | * | 9/2009 | Ghassemi | 290/1 R |
| 7,629,698 B2 | | 12/2009 | Horianopoulos et al. | |
| 7,687,931 B2 | | 3/2010 | Gasendo | |
| 7,714,456 B1 | | 5/2010 | Daya | |
| 7,717,043 B2 | | 5/2010 | Rastegar et al. | |
| 2002/0014314 A1 | | 2/2002 | Miller | |
| 2003/0132636 A1 | | 7/2003 | Ricketts | |
| 2003/0151381 A1 | | 8/2003 | Kadota et al. | |
| 2004/0066041 A1 | | 4/2004 | Hunter, Jr. | |
| 2005/0116545 A1 | | 6/2005 | Hamel et al. | |
| 2005/0143876 A1 | | 6/2005 | Tanase | |
| 2005/0200132 A1 | | 9/2005 | Kenney | |
| 2005/0268444 A1 | | 12/2005 | Namerikawa et al. | |
| 2006/0152008 A1 | | 7/2006 | Ghassemi | |
| 2006/0237968 A1 | | 10/2006 | Chandrasekaran | |
| 2007/0018803 A1 | | 1/2007 | Lang | |
| 2007/0020047 A1 | | 1/2007 | Adair | |
| 2007/0085342 A1 | | 4/2007 | Horianopoulos et al. | |
| 2007/0158945 A1 | | 7/2007 | Annen et al. | |
| 2007/0210652 A1 | | 9/2007 | Tracy et al. | |
| 2007/0264081 A1 | | 11/2007 | Chiu | |
| 2008/0224477 A1 | | 9/2008 | Kenney | |
| 2009/0315334 A1 | | 12/2009 | Chen | |

FOREIGN PATENT DOCUMENTS

| | | |
|---|---|---|
| CN | 201050452 Y | 4/2008 |
| CN | 201396254 Y | 2/2010 |
| JP | 2000310102 A | 11/2000 |
| JP | 2002161848 A | 6/2002 |

OTHER PUBLICATIONS

Blaine R. Copenheaver, International Search Report, PCT/US2009/066025, Mar. 10, 2010, p. 2, Alexandria, VA, US.

Lee W. Young, International Search Report, PCT/US2010/022287, Jun. 1, 2010, p. 2, Alexandria, VA, US.

Blaine R. Copenheaver, International Search Report, PCT/US2010/022288, Jul. 12, 2010, p. 2, Alexandria, VA, US.

Lee W. Young, International Search Report, PCT/US2010/022289, Jun. 1, 2010, p. 2, Alexandria, VA, US.

Lee W. Young, International Search Report, PCT/US2010/022291, Jun. 15, 2010, p. 2, Alexandria, VA, US.

Blaine R. Copenheaver, International Search Report, PCT/US2010/022294, Jun. 28, 2010, p. 2, Alexandria, VA, US.

Blaine R. Copenheaver, International Search Report, PCT/US2010/022296, Jul. 29, 2010, p. 2, Alexandria, VA, US.

Lee W. Young, International Search Report, PCT/US2010/020676, Jun. 15, 2010, p. 2, Alexandria, VA, US.

National Search Report CN2010800146126 dated Aug. 6, 2013.
National Search Report CN2010800146145 dated Jul. 26, 2013.
National Search Report CN2009801552247 dated Mar. 19, 2013.

* cited by examiner

ENERGY HARVESTING ROADWAY PANEL

CROSS-REFERENCE TO RELATED APPLICATIONS

The present invention claims the benefit of U.S. Provisional Patent Application No. 61/143,754, filed Jan. 9, 2009, and entitled "VEHICLE ENERGY HARVESTING", the entire contents of which are incorporated herein by reference in their entirety.

FIELD OF THE INVENTION

The present invention is directed toward devices and methods of harvesting vehicle energy, and more specifically, toward devices and methods of hydraulically harvesting vehicle energy.

BACKGROUND OF THE INVENTION

Vehicles require energy to move, and when they slow or come to a stop, they dissipate some of that energy into the environment as heat. That heat represents energy that is effectively "lost" or unutilized. Over the years, people have devised mechanical contrivances that attempt to capture some of the vehicle motion energy before it is released as heat. Few of these systems have ever been implemented because of their mechanical complexity, limited energy capture ability, and susceptibility to environmental factors.

One potential response to these issues is to create a vehicle energy harvester that uses moving vehicles to pump a working fluid in the roadway. Using a working fluid can reduce part count and provide a closed system, both of which may improve reliability. Conventional fluid-based approaches have implemented a series of deformable hoses transverse to a roadway or a single large bladder below the roadway. Both methods rely on passing vehicle wheels to compress the hoses and thereby pump fluid within them to drive an electrical generator. However, both approaches are flawed, because they create significant pumping inefficiencies. In the case of transverse hoses, a passing vehicle wheel can compress only a small portion of the fluid-bearing hose and does so very briefly. In the case of a large bladder, a passing wheel will compress only a small portion of the bladder's width, allowing fluid to escape around the wheel without being pumped uniformly towards a generator.

Ideally, a passing wheel would completely seal a compressible hose beneath the roadway and then travel along the length of the hose to expel fluid from one hose end. However, placing one or more hoses along the direction of vehicle travel alone is insufficient. Vehicles travel along a variety of paths within a roadway lane and therefore contact the roadway at variable lateral positions. Consequently, a passing wheel may straddle one or more hoses in a roadway without compressing them, defeating the system. Moreover, a roadway lane cannot be simply packed with longitudinal hoses, because the hoses need separation to flatten as they compress. Therefore the fluid-based vehicle energy harvester, as conceived to date, has the potential to outperform competing energy harvesting approaches, but it faces heretofore unaddressed implementation challenges.

SUMMARY OF THE INVENTION

These problems and others are addressed by the present invention.

In an embodiment of the present invention, a deformable driving surface is disposed between vehicle wheels and one or more compressible, fluid-bearing hoses. The driving surface is flexible along its length such that it can contour to the shape of a passing wheel. The driving surface is also stiff along its width, such that contouring of the driving surface around a wheel compresses the one or more compressible, fluid-bearing hoses. These hoses may be adjacent or spaced apart.

In an exemplary embodiment, the deformable driving surface is a single unit that provides both the longitudinal flexibility and transverse stiffness. In another embodiment, the driving surface consists of multiple components that in combination allow the surface to bend along its length and resist bending across its width.

For purposes of this disclosure, a length of the deformable surface is a dimension in the direction of vehicle travel and the width of the surface is defined as a dimension transverse to the length of the deformable surface and in a plane substantially parallel to the roadway surface.

In an exemplary embodiment, the deformable driving surface acts on compressible hoses. In other exemplary embodiments, the deformable driving surface may act on other transducers that convert the lengthwise deformation of the deformable driving surface into another form of energy. For example, piezoelectric and capacitive transducers are two types of alternatives to the compressible, fluid-bearing hoses. Other alternatives to the compressible, fluid-bearing hoses also are possible.

BRIEF DESCRIPTION OF THE DRAWINGS

These and other aspects and features of the present invention will be better understood after a reading of the following detailed description, together with the attached drawings, wherein.

DETAILED DESCRIPTION OF THE EXEMPLARY EMBODIMENTS

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
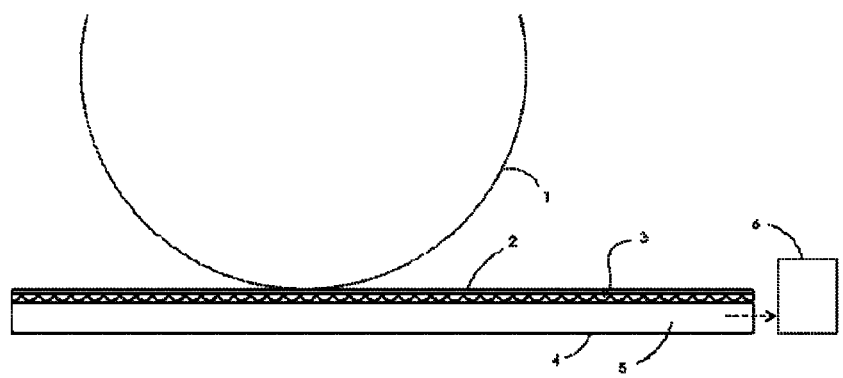
FIG. 1 is a schematic illustrating a single-unit deformable driving surface in concert with compressible, fluid-bearing hoses according to an exemplary embodiment.
Figure 2:
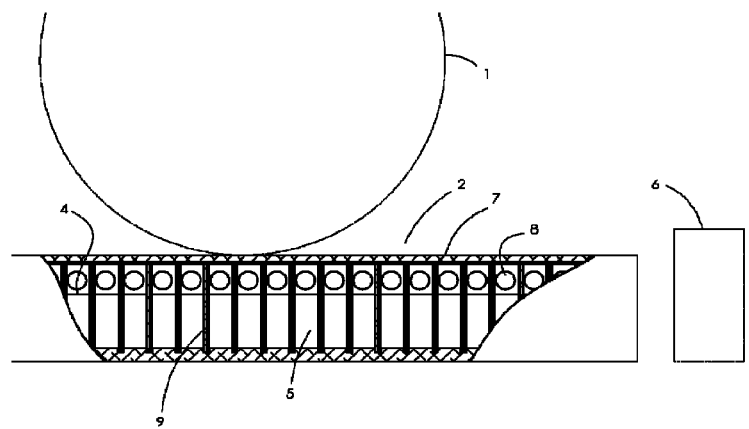
FIG. 2 is a schematic illustrating a deformable driving surface composed of multiple units, in concert with compressible, fluid-bearing hoses according to an exemplary embodiment.

Referring now to the drawings, FIGS. 1-5 illustrate exemplary embodiments of a vehicle energy harvesting roadway. With reference to FIGS. 1 and 2, exemplary embodiments of the vehicle energy harvesting roadway can include one or more compressible hoses 4 disposed lengthwise along a direction of vehicle travel, and a deformable surface 2 (e.g., deformable driving surface) disposed between the one or more compressible hoses 4 and the one or more wheels 1 of a passing vehicle. The deformable surface 2 can be longitudinally flexible and/or transversely stiff such that depression of the deformable surface causes the one or more compressible hoses to compress. Preferably, the deformable surface 2 is both longitudinally flexible and transversely stiff. The deformable surface 2 can be configured to transmit a force or displacement between a vehicle wheel 1 of a passing vehicle and the one or more compressible hoses 4.

The deformable surface 2 can be formed by a single unit that provides, for example, both longitudinal flexibility and transverse stiffness. In other embodiments, the deformable surface 2 can be formed by a plurality of components or elements that either individually or in combination provide both longitudinal flexibility and transverse stiffness (i.e., allow the surface 2 to bend along a length of the surface 2 and resist bending across a width of the surface 2). The deformable surface 2 can be formed by one or more deformable materials or individual elements, or from a plurality of substantially rigid materials or elements configured to move in relation to one another to provide deformation of the deformable surface 2.

The compressible hoses 4 can include a fluid 5 that can be pumped under peristaltic action to, for example, a fluid energy converter 6. The fluid energy converter 6 can be any conventional device known for converting fluid energy into mechanical, thermal, or electrical energy, etc.

In another exemplary embodiment, the energy harvesting roadway can include one or more compressible hoses 4 disposed lengthwise along a direction of vehicle travel, and a deformable surface 2 disposed between the one or more compressible hoses 4 and the one or more wheels 1 of a passing vehicle. The deformable surface 2 can bend along one or more of a length and a width of the deformable surface, such that the deformable surface can transmit compression forces to the one or more compressible hoses 4. Preferably, the deformable surface 2 can bend along the length and along the width of the deformable surface, such that the deformable surface can transmit compression forces to the one or more compressible hoses 4. The deformable surface 2 can be longitudinally flexible and/or transversely stiff such that depression of the deformable surface causes the one or more compressible hoses to compress. Preferably, the deformable surface 2 is both longitudinally flexible and transversely stiff.

Referring again to FIG. 1, an embodiment of the energy harvesting roadway can include one or more members or elements, such as one or more struts 3, interposing the deformable driving surface 2 and the compressible hoses 4. The struts 3 can be coupled or fastened to the deformable driving surface 2, thereby creating a single unit (e.g., a single-unit deformable driving surface). In operation, when the vehicle wheel 1 acts on the deformable driving surface 2, the deformable driving surface 2 deforms and transmits a force along the struts 3 to the compressible hoses 4. The fluid 5 in compressible hoses 4 then can be pumped under peristaltic action to, for example, a fluid energy converter 6.

With reference to FIG. 2, another embodiment of the energy harvesting roadway can include one or more members or elements, such as one or more rods 8, interposing the main surface 7 of the deformable driving surface 2 and the compressible hoses 4. The rods 8 can be, for example, solid rods or hollow tubes. In this embodiment, the rods 8 can be detached from the main surface 7, such that the plurality of rods 8 and main surface 7 together form the deformable driving surface 2 (e.g., a multiple-unit deformable driving surface). The deformable driving surface 2 can include one or more supports 9 for guiding the rods 8. In operation, when the vehicle wheel 1 acts on the main surface 7 of the deformable driving surface 2, the main surface 7 of the deformable driving surface 2 can deform and transmit a force along the rods 8, which are guided by the one or more supports 9, to the compressible hoses 4. The fluid 5 in compressible hoses 4 then can be pumped under peristaltic action to, for example, a fluid energy converter 6.

Figure 3:
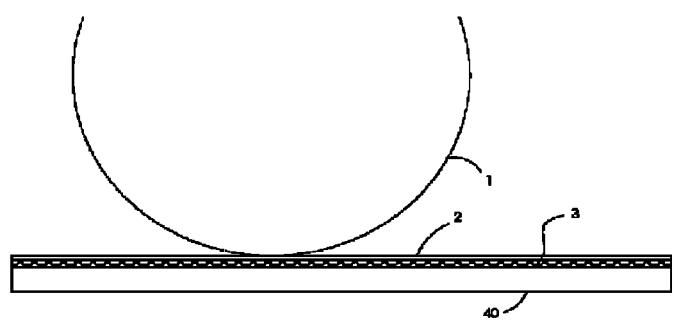
FIG. 3 is a schematic illustrating a single-unit deformable driving surface in concert with transducers according to an exemplary embodiment.
Figure 4:
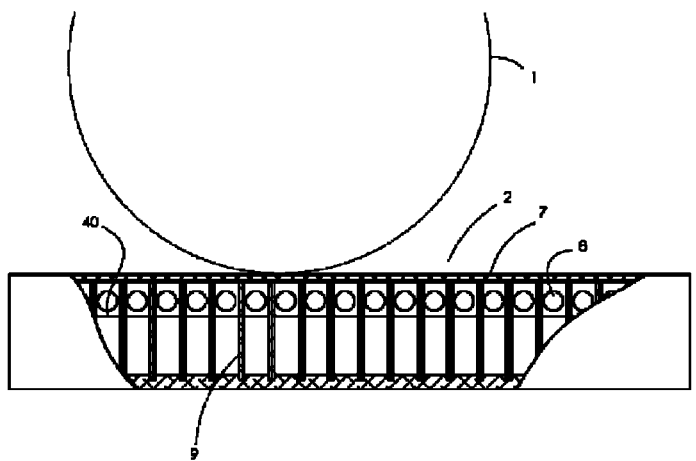
FIG. 4 is a schematic illustrating a deformable driving surface composed of multiple units, in concert with transducers according to an exemplary embodiment.

With reference to FIGS. 3 and 4, another exemplary embodiment of the energy harvesting roadway can include one or more transducers 40 disposed lengthwise along a direction of vehicle travel, and a deformable surface 2 disposed between the one or more transducers 40 and the one or more wheels 1 of a passing vehicle. The deformable surface 2 can bend along one or more of a length and a width of the deformable surface, such that the deformable surface can transmit compression forces to the one or more transducers 40. Preferably, the deformable surface 2 can bend along the length and along the width of the deformable surface, such that the deformable surface can transmit compression forces to the one or more transducers 40. The deformable surface 2 can be longitudinally flexible and/or transversely stiff. Preferably, the deformable surface 2 is both longitudinally flexible and transversely stiff.

Referring to FIG. 3, an embodiment of the energy harvesting roadway can include one or more members or elements, such as one or more struts 3, interposing the deformable driving surface 2 and the transducers 40. The struts 3 can be coupled or fastened to the deformable driving surface 2, thereby creating a single unit (e.g., a single-unit deformable driving surface). In operation, when the vehicle wheel 1 acts on the deformable driving surface 2, the deformable driving surface 2 deforms and transmits a force along the struts 3 to the transducers 40.

With reference to FIG. 4, another embodiment of the energy harvesting roadway can include one or more members or elements, such as one or more rods 8, interposing the main surface 7 of the deformable driving surface 2 and the transducers 40. The rods 8 can be, for example, solid rods or hollow tubes. In this embodiment, the rods 8 can be detached from the main surface 7, such that the plurality of rods 8 and main surface 7 together form the deformable driving surface 2 (e.g., a multiple-unit deformable driving surface). The deformable driving surface 2 can include one or more supports 9 for supporting and/or guiding the rods 8. In operation, when the vehicle wheel 1 acts on the main surface 7 of the deformable driving surface 2, the main surface 7 of the deformable driving surface 2 can deform and transmit a force along the rods 8, which are guided by the one or more supports 9, to the transducers 40.

Figure 5:
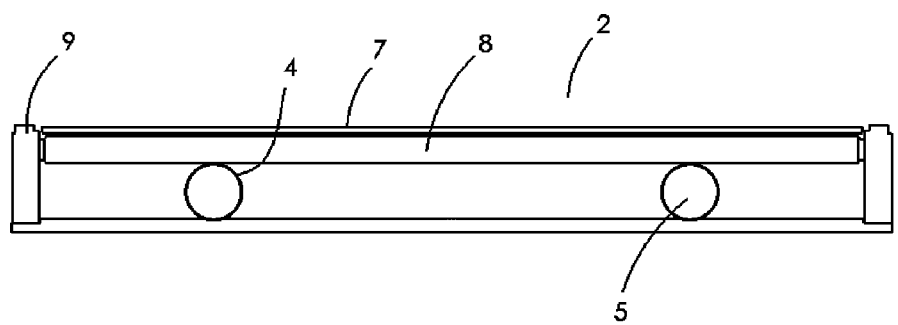
FIG. 5 is a schematic cross-sectional view of a deformable driving surface in concert with compressible, fluid-bearing hoses according to an exemplary embodiment.

With reference to FIG. 5, an exemplary embodiment of the vehicle energy harvesting roadway can include one or more compressible hoses 4 disposed lengthwise along a direction of vehicle travel along the energy harvesting roadway, and a deformable surface 2 (e.g., deformable driving surface) disposed between the one or more compressible hoses 4 and the one or more wheels of a passing vehicle. The deformable surface 2 can be longitudinally flexible and/or transversely stiff such that depression of the deformable surface causes the one or more compressible hoses to compress. Preferably, the deformable surface 2 is both longitudinally flexible and transversely stiff. The deformable surface 2 can be configured to transmit a force or displacement between a vehicle wheel of a passing vehicle and the one or more compressible hoses 4.

The compressible hoses 4 can include a fluid 5 that can be pumped under peristaltic action to, for example, a fluid energy converter (not shown in FIG. 5). The fluid energy converter can be any conventional device known for converting fluid energy into mechanical, thermal, or electrical energy, etc.

As shown in FIG. 5, the embodiment of the energy harvesting roadway can include one or more members or elements, such as one or more rods 8, interposing a main surface 7 of the deformable driving surface 2 and the compressible hoses 4. The rods 8 can be, for example, solid rods or hollow tubes. In this embodiment, the rods 8 can be detached from the main surface 7, such that the plurality of rods 8 and main surface 7 together form the deformable driving surface 2 (e.g., a multiple-unit deformable driving surface). The deformable driving surface 2 can include one or more supports 9 for supporting and/or guiding the rods 8. In operation, when the vehicle wheel 1 acts on the main surface 7 of the deformable driving surface 2, the main surface 7 of the deformable driving surface 2 can deform and transmit a force along the rods 8, which are guided and/or supported by the one or more supports 9, to the compressible hoses 4. The fluid 5 in compressible hoses 4 then can be pumped under peristaltic action to, for example, a fluid energy converter 6.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An energy harvesting roadway comprising:
   an energy conversion device disposed lengthwise along a direction of vehicle travel along the energy harvesting roadway;
   a deformable surface disposed between the energy conversion device and the one or more wheels of a passing vehicle, wherein the deformable surface is one of longitudinally flexible and transversely stiff, the deformable surface having a longitudinal length in the direction of vehicle travel and a transverse width in a direction transverse to the direction of vehicle travel and substantially in a plane of the energy harvesting roadway; and
   one or more members interposing the deformable surface and the energy conversion device, the one or more members having a member transverse width in the direction of vehicle travel and a member longitudinal length in the direction transverse to the direction of vehicle travel, wherein the one or more members transmit one of a force and a displacement between the deformable surface and the energy conversion device,
   wherein the energy conversion device includes at least one of:
      one or more compressible hoses, the one or more compressible hoses having a hose length in the direction of vehicle travel and a hose width in the direction transverse to the direction of vehicle travel; and
      one or more transducers, the one or more transducers having a transducer length in the direction of vehicle travel and a transducer width in the direction transverse to the direction of vehicle travel,
   wherein the transducers include at least one of:
      a piezoelectric transducer; and
      a capacitive transducer.

2. The energy harvesting roadway of claim 1, further comprising:
   a support that supports and guides a first member of the one or more members to the energy conversion device, the support including a pair of vertical portions disposed on each side of the energy conversion device, the pair of vertical portions guiding the first member in a vertical direction to the energy conversion device.

3. An energy harvesting roadway comprising:
one or more compressible hoses disposed lengthwise along a direction of vehicle travel along the energy harvesting roadway, the one or more compressible hoses disposed such that a fluid therein is configured to move in the direction of vehicle travel along a length of the one or more compressible hoses;
a deformable surface disposed between the one or more compressible hoses and the one or more wheels of a passing vehicle, wherein the deformable surface is longitudinally flexible and transversely stiff, such that the one or more compressible hoses are compressed by a depression of the deformable surface;
one or more rods having a width in the direction of vehicle travel and a length in the direction transverse to the direction of vehicle travel; and
one or more supports that support and guide the rods to the one or more compressible hoses, a portion of the one or more supports being disposed between each of the one or more compressible hoses.

4. The energy harvesting roadway of claim 3, further comprising:
a support that supports and guides a first member of the one or more members to a first hose of the one or more compressible hoses, the support including a pair of vertical portions disposed on each side of the first hose, the pair of vertical portions guiding the first member in a vertical direction to the first hose.

5. An energy harvesting roadway comprising:
one or more compressible hoses disposed lengthwise along a direction of vehicle travel along the energy harvesting roadway, the one or more compressible hoses having a hose length in the direction of vehicle travel and a hose width in a direction transverse to the direction of vehicle travel;
a deformable surface disposed between the one or more compressible hoses and the one or more wheels of a passing vehicle, the deformable surface having a length in the direction of vehicle travel and a width in the direction transverse to the direction of vehicle travel and substantially in a plane of the energy harvesting roadway; and
one or more members interposing the deformable surface and the one or more compressible hoses, the one or more members having a member transverse width in the direction of vehicle travel and a member longitudinal length in the direction transverse to the direction of vehicle travel,
wherein the deformable surface transmits compression forces to the one or more members by one of bending along the length and bending along the width of the deformable surface, and
wherein the one or more members transmit one of a force and a displacement to the one or more compressible hoses.

6. The energy harvesting roadway of claim 5, wherein the deformable surface transmits compression forces to the one or more members by bending along the length and bending along the width of the deformable surface.

7. An energy harvesting roadway comprising:
one or more compressible hoses disposed lengthwise along a direction of vehicle travel along the energy harvesting roadway, the one or more compressible hoses having a hose length in the direction of vehicle travel and a hose width in the direction transverse to the direction of vehicle travel; and
a deformable surface disposed between the one or more compressible hoses and the one or more wheels of a passing vehicle, wherein the deformable surface is one of longitudinally flexible and transversely stiff; and
one or more members interposing the deformable surface and the one or more compressible hoses, the one or more members having a member transverse width in the direction of vehicle travel and a member longitudinal length in the direction transverse to the direction of vehicle travel, wherein the one or more members transmit one of a force and a displacement between the deformable surface and the one or more compressible hoses.

8. The energy harvesting roadway of claim 7, the deformable surface is longitudinally flexible and transversely stiff.

9. The energy harvesting roadway of claim 7, wherein the deformable surface transmits one of a force and a displacement between the passing vehicle and the one or more compressible hoses.

10. The energy harvesting roadway of claim 7, comprising:
a fluid energy converter in communication with the one or more compressible hoses.

11. The energy harvesting roadway of claim 7, wherein the one or more members includes one or more struts.

12. The energy harvesting roadway of claim 11, wherein the one or more struts are coupled to a surface of the deformable surface.

13. The energy harvesting roadway of claim 7, wherein the one or more members includes one or more rods, the one or more rods having a width in the direction of vehicle travel and a length in the direction transverse to the direction of vehicle travel.

14. The energy harvesting roadway of claim 13, further comprising:
one or more supports that support and guide the rods to the one or more compressible hoses, a first portion of the one or more supports being disposed between each of the one or more compressible hoses and a second portion of the one or more supports supporting and guiding the rods above the one or more compressible hoses.

15. An energy harvesting roadway comprising:
one or more transducers disposed lengthwise along a direction of vehicle travel along the roadway, the one or more transducers having a transducer length in the direction of vehicle travel and a transducer width in the direction transverse to the direction of vehicle travel;
a deformable surface disposed between the one or more transducers and one or more wheels of a passing vehicle, wherein the deformable surface is one of longitudinally flexible and transversely stiff; and
one or more members interposing the deformable surface and the one or more transducers, the one or more members having a member transverse width in the direction of vehicle travel and a member longitudinal length in the direction transverse to the direction of vehicle travel, wherein the one or more members transmit one of a force and a displacement between the deformable surface and the one or more transducers,
wherein the transducers include at least one of:
a piezoelectric transducer, and
a capacitive transducer.

16. The energy harvesting roadway of claim 15, wherein the deformable surface is longitudinally flexible and transversely stiff.

17. The energy harvesting roadway of claim 15, wherein the deformable surface transmits one of a force and a displacement between the passing vehicle and the one or more transducers.

18. The energy harvesting roadway of claim 15, further comprising:

a support that supports and guides a first member of the one or more members to a first transducer of the one or more transducers, the support including a pair of vertical portions disposed on each side of the first transducer, the pair of vertical portions guiding the first member in a vertical direction to the first transducer.

19. The energy harvesting roadway of claim 15, wherein the one or more members includes one or more struts.

20. The energy harvesting roadway of claim 19, wherein the one or more struts are coupled to a surface of the deformable surface.

21. The energy harvesting roadway of claim 15, wherein the one or more members includes one or more rods.

22. The energy harvesting roadway of claim 21, comprising:

one or more supports that support and guide the rods to the one or more transducers, a portion of the one or more supports being disposed between each of the one or more transducers.

* * * * *